United States Patent [19]
Brown

[11] 3,843,792
[45] Oct. 22, 1974

[54] METHOD FOR CONTROLLING BACTERIA AND ALGAE WITH N-TETRAHALOETHYLTHIO CARBOXAMIDES

[75] Inventor: Melancthon S. Brown, Berkeley, Calif.

[73] Assignee: Chevron Research Company, San Francisco, Calif.

[22] Filed: Feb. 7, 1972

[21] Appl. No.: 224,290

Related U.S. Application Data

[63] Continuation of Ser. No. 841,612, July 14, 1969, abandoned.

[52] U.S. Cl. ................................... 424/320, 71/67
[51] Int. Cl. ........................................... A01n 9/20
[58] Field of Search ..................... 71/67; 424/320

[56] References Cited
UNITED STATES PATENTS
3,344,153  9/1967  Kuhle et al. .................... 424/320

3,646,097  2/1972  Stevick ............................ 71/67
3,679,673  7/1972  Brown .............................. 71/67
3,697,571  10/1972  Brown ............................ 71/67

FOREIGN PATENTS OR APPLICATIONS
1,317,400  1/1963  France ........................... 424/320

*Primary Examiner*—James O. Thomas, Jr.
*Attorney, Agent, or Firm*—G. F. Magdeburger; John Stoner, Jr.; Raymond Owyang

[57] ABSTRACT

Bacteria and algae are controlled with compounds of the formula

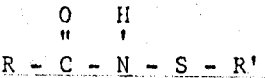

in which R is hydrogen or methyl and R' is tetrahaloethyl wherein the halogens are chlorine or bromine. These compounds are prepared by reacting a primary carboxamide with tetrahaloethylsulfenyl halide.

7 Claims, No Drawings

METHOD FOR CONTROLLING BACTERIA AND ALGAE WITH N-TETRAHALOETHYLTHIO CARBOXAMIDES

This application is a continuation of application Ser. No. 841,612, filed July 14, 1969, now abandoned.

FIELD OF INVENTION

This invention relates to methods for controlling bacteria and algae.

BACKGROUND OF INVENTION

U.S. Pat. No. 3,344,153 suggests N-tetrachloroethylthio carboxamides but does not show any working examples of such compounds. The data reported in this patent show that N-fluoromethylthio aromatic and heterocyclic carboxamides are fungicidal and miticidal.

INVENTION DESCRIPTION

It has been found that a select group of the carboxamides described by U.S. Pat. No. 3,344,153 have unusual bactericidal and algicidal properties. This unique group of carboxamides are of the formula:

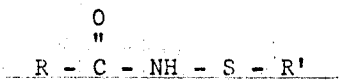

in which R is hydrogen or methyl and R' is tetrahaloethyl wherein the halogens are chlorine or bromine. Preferably, R' is tetrachloroethyl, especially 1,1,2,2-tetrachloroethyl.

Typical examples of N-tetrahaloethylthio carboxamides of the above formula are: N-1,1,2,2-tetrachloroethylthio formamide, N-1,2,2,2-tetrachloroethylthio formamide, N-2-bromo-1,1,2-trichloroethylthio formamide, 1,1,2,2-tetrabromoethylthio formamide, N-1,1,2,2-tetrachloroethylthio acetamide, N-1,2,2,2-tetrachloroethylthio acetamide, N-1,2,2,2-tetrabromoethylthio acetamide, N-1,2-dibromo-2,2-dichloroethylthio acetamide and N-1,1,2-tribromo-2-chloroethylthio acetamide.

The carboxamides of the above formula may be prepared by condensing a primary carboxamide with a tetrahaloethylsulfenyl halide, usually a chloride. This reaction may be represented by the following chemical equation:

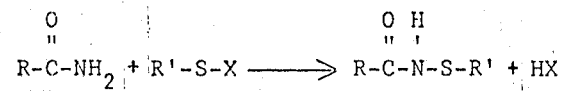

wherein R and R' are as defined previously and X is chlorine or bromine.

It is desirable to carry out this reaction in the presence of inert solvents such as dimethylsulfoxide, dimethylformamide, acetonitrile, dioxane, methylene chloride and the like. The reaction temperature is, in general, not critical and will usually be in the range of about −20° to about 50°C., preferably about 0° to 20°C. Likewise, the pressure is not critical and will usually be atmospheric or autogenous. It is desirable to use stoichiometric proportions of the reactants or a slight excess of the carboxamide.

The N-tetrahaloethylthio carboxamides described above have been found to control plant pathogenic bacteria and algae when applied to these organisms in bactericidal/algicidal amounts. They are especially effective in controlling bacteria and algae which foul aqueous industrial effluents and cooling streams such as those occuring in the paper and food processing industries, as well as other aqueous bodies such as lakes, pools, streams and the like. When used to control bacteria and algae growth in aqueous bodies, one or more of the carboxamides of the above formula is (are) added in an amount which will inhibit the growth of these organisms. Usually they will be used in aqueous bodies at concentrations ranging between about 0.1 and 50 ppm. For instance, when used primarily to control algae, these carboxamides will usually be employed at concentrations of about 0.1 to 10 ppm. In terms of pounds of carboxamide per acre of water one foot deep 0.1 to 10 ppm. is equal to about 0.3 to 30 lbs. These carboxamides may be applied to the aqueous growth environments of such bacteria and algae as dispersible powders, water-emulsible concentrates or in solution with water-miscible solvents.

Typical solid carriers which may be used to formulate these carboxamides are clay, talc, chalk and sawdust. Representative solvents which may be used to formulate these carboxamides include aromatic hydrocarbons such as xylene, benzene, toluene, petroleum fractions, alcohols (especially low molecular weight alkanols) and chlorinated aliphatic hydrocarbons such as chloroform, methylene chloride and the like. These formulations may also contain emulsifying agents, sticking agents, fillers and other compatible pesticides.

EXAMPLES

The following examples may be used to prepare the carboxamides used in the methods of this invention and their application to bacteria and algae. These examples are not intended to limit the invention described herein. Percentages are by weight.

Example 1 (Preparation of N-1,1,2,2-tetrachloroethylthio formamide)

20 g. of formamide and 100 ml. of dimethyl formamide were mixed in a vessel cooled in an ice bath. 20 g. of 1,1,2,2-tetrachloroethylsulfenyl chloride was added slowly to this mixture. After this addition the vessel was removed from the ice bath and allowed to stand for 18 hours at ambient temperature. 500 ml. of ice water was added to the vessel and the mixture was extracted with two 200 ml. portions of ethyl ether. The ether extracts were washed with saturated sodium chloride solution and dried over magnesium sulfate. After drying the ether was stripped off and the material was recrystallized from a mixture of benzene and hexane to give 7 g. of N-1,1,2,2-tetrachloroethylthio formamide. This compound, a solid, melted at 40-45°C. Its sulfur and chlorine analyses were:

S: Calculated: 13.18%; Found: 12.8%
Cl: Calculated: 58.4%; Found: 57.6%.

Example 2

N-1,1,2,2-tetrachloroethylthio acetamide was prepared by the general procedure described in Example 1. This compound, also a solid, melted at 89–92°C. Its sulfur and chlorine analyses were:

S: Calculated: 12.46%; Found: 12.43%
Cl: Calculated: 55.2%; Found: 54.15%

The carboxamides of Examples 1 and 2 were tested as bactericides and algicides by the following methods.

Algicides

An acetone solution of equal parts of carboxamide was prepared. This solution was mixed with a nutrient broth in a quantity sufficient to give a concentration of 2 ppm. carboxamide. Four replicate 150 ml. specimen cups were filled with this mixture. 350–400 mg. of the test organism was added to each specimen cup and the cups were then placed in an environment chamber for incubation. The cups were observed periodically for algae growth. The algicidal effectiveness of the carboxamide was determined based on a final observation of algae growth after 10 days.

The results of these tests, reported as the average of the 4 replicates on a 0 to 100 basis — 0 indicating no effectiveness; 100 indicating complete effectiveness — are reported in Table I.

Bactericides

Bacteria suspensions were prepared by washing a culture of the desired bacteria from an agar slant with sterile water into a vessel and further diluting the aqueous suspension to 250 ml. with sterile water.

The carboxamide to be tested was dissolved in acetone to 500 ppm. and 30 λ of this solution was pipetted onto each of two surface areas on a plate covered with 20 ml. of Emerson's agar. The treated agar plates were then sprayed with the bacteria suspension and the plates were incubated for 44 to 48 hours at 24°C. The two treated areas of the plate were then observed for bacterial growth. The carboxamide's effectiveness for controlling bacterial growth in the treated areas was rated as + or −; + indicated the areas were completely free of bacterial growth and − indicating they were completely overgrown. The results of this bactericidal testing are also reported in Table I.

In other bactericidal tests N-(1,1,2,2-tetrachloroethylthio) formamide at 10 ppm. exhibited substantial (in excess of 50 percent) control of *Xanthomonas phaseoli*, *Agrobacterium tamafaciens*, *Corynebacteria michiganense* and *A. aeorogenes*.

I claim:

1. Method for controlling bacterial growth in an aqueous body which comprises adding a bactericidal quantity of a compound of the formula:

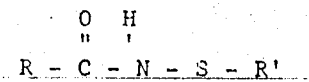

wherein R is hydrogen or methyl and R' is tetrahaloethyl wherein the halogens are of atomic number 17 to 35, to the aqueous body.

2. Method of claim 1 wherein R' is tetrachloroethyl.

3. Method of claim 1 wherein R' is 1,1,2,2-tetrachloroethyl.

4. Method of claim 1 wherein the concentration of the compound in the aqueous body is in the range of 0.1 and 50 ppm.

5. Method for controlling plant pathogenic bacteria which comprises applying a bactericidal quantity of a compound of the formula:

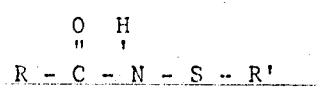

wherein R is hydrogen or methyl and R' is tetrahaloethyl wherein the halogens are of atomic number 17 to 35, to the bacteria.

6. The method of claim 5 wherein R' is tetrachloroethyl.

7. The method of claim 5 wherein R' is 1,1,2,2-tetrachloroethyl.

\* \* \* \* \*

TABLE I

| Compound | Effectiveness | | | |
| --- | --- | --- | --- | --- |
| | Algicide | | Bactericide | |
| | Nitella | Euglena | Pseudommas Syringae | Erwinia Carotorora |
| N-(1,1,2,2-tetrachloroethylthio) formamide | 100 | 100 | + | + |
| N-(1,1,2,2-tetrachloroethylthio) acetamide | 86 | — | + | + |